United States Patent [19]

Minagawa et al.

[11] Patent Number: 4,569,400
[45] Date of Patent: Feb. 11, 1986

[54] DRILLER FOR USE IN RICE FIELD

[75] Inventors: Isao Minagawa; Toshio Minagawa, both of Yoshida, Japan

[73] Assignee: Fuji Trailer Manufacturing Co., Ltd., Niigata, Japan

[21] Appl. No.: 605,497

[22] Filed: Apr. 30, 1984

[51] Int. Cl.⁴ ............................................. A01B 45/02
[52] U.S. Cl. ...................... 172/21; 172/101; 111/89
[58] Field of Search .................. 172/21, 22, 61, 101, 172/93, 19, 20; 111/2, 6, 89

[56] References Cited

U.S. PATENT DOCUMENTS

| 270,994 | 1/1883 | Springer | 172/101 X |
| 1,871,529 | 8/1932 | Karshner | 111/6 |
| 2,063,333 | 12/1936 | Nolte | 172/22 |
| 2,223,559 | 12/1940 | Fleming | 172/431 X |
| 2,800,066 | 7/1957 | Cohrs | 172/93 X |
| 3,986,562 | 10/1976 | Killion | 172/22 |

FOREIGN PATENT DOCUMENTS

| 354982 | 6/1922 | Fed. Rep. of Germany | 111/89 |
| 50020 | 1/1932 | Norway | 111/89 |
| 497277 | 12/1938 | United Kingdom | 172/22 |

Primary Examiner—Richard J. Johnson
Attorney, Agent, or Firm—Fulbright & Jaworski

[57] ABSTRACT

This driller for use in a rice field comprises attaching vertical rods, with freedom of up and down, to a main frame connected to a tractor; attaching, to the main frame, an up and down mechanism which is driven by a driving source mounted on the tractor to ascend and descend vertical rods; providing guide rails, which were provided horizontally at the lower ends of vertical rods, with supporting frames movable horizontally along the guide rails; interposing a tension spring between the supporting frames and guide rails, the spring which acts to bias the supporting frame forward; and providing the supporting frame with perpendicular drilling rods.

3 Claims, 3 Drawing Figures

DRILLER FOR USE IN RICE FIELD

BACKGROUND OF THE INVENTION

This invention relates to a driller which can drill a number of holes automatically in a rice field.

In recent years, the tillage work in the rice field has been made by driving various large-sized agricultural implements and machines such as tractor, combined harvester and thresher, and the like in the rice fields. As the result of this, the rice field surface is hardened by the weight of these machines, and thus there is formed a hardened earth layer of even about 20–30 cm in depth. However, since the depth of a layer cultivated by a tractor is only about 10–15 cm, there remains a hardened earth layer of about 10–15 cm in depth under this cultivated layer. The presence of a remaining hardened earth layer like this not only prevents the aquatic rice from spreading its root in the deep portion of the earth layer, but also hinders the performance of the under-drain formed at a place lower about 100 cm than the rice field surface, namely watering and/or draining performance. Due to this, it becomes impossible or difficult to make a planned and organized water control system, which is indispensable for favorable growth of rice plants, such as supply of water, supplement of water, excess water draining and the like, whereby there takes place such a phenomenon that the soil gets worse and the growth of aquatic rice is hindered.

In view of the fact that any effective means to solve the above mentioned phenomenon have not been proposed yet, the inventor of this invention has done various studies to find such means, and has found that it is effective to solve this problem by drilling longitudinal holes, having a diameter of about 3 cm and a depth of about 30–60 cm, in the rice field, preferably at intervals of about 25–30 cm.

SUMMARY OF THE INVENTION

It is an object of this invention to provide a driller which is attached to a tractor and is capable of drilling the aforesaid longitudinal holes in the rice field automatically, without adopting any special operation, as a tractor drives.

In order to achieve said object, this invention provides a driller including a main frame connected with a tractor; an up and down means or vertically moving means attached, with freedom of up and down, to this frame; an up and down mechanism driven by a driving source and attached to said main frame in order to ascend and descend said up and down means; a guide means provided horizontally at the ower end of said up and down means; a supporting means attached to said guide means movably in the horizontal direction along said guide means; a biasing means disposed between said guide means and said supporting means and designed to bias said supporting means constantly toward the running direction of the tractor; and a drilling means disposed perpendicularly to said supporting means.

It is another object of this invention to provide a driller which is capable of efficiently and automatically drilling substantially fixed depth holes at substantially regular intervals without stopping the running of the tractor as well as irrespective its running speed.

The above mentioned object can be achieved by a preferred embodiment of the present invention. That is, the embodiment is designed so that a main frame is provided with a vertical rod with freedom of vertical movement, said vertical rod is connected with a crank, attached to the main frame, by means of a connecting rod; said crank is attached to the shaft of a driven sprocket which is rotated through a chain by a driving sprocket, said driving sprocket being rotated by a driving source of a tractor; said vertical rod is provided at its lower end with a horizontal guide rail; a supporting frame is provided which has a roller rolling on this guide rail; said supporting frame is provided perpendicularly with a drilling means; and a tension spring is provided between the supporting frame and the guide rail in order to bias the supporting frame constantly toward the advancing direction of the tractor. In the embodiment like this, in accordance with the change in speed of the tractor, i.e. the main frame, the rotating speed of the crank also changes and the up and down distance of the vertical rod, i.e. the drilling means also changes, whereby drilling can be effected constantly at substantially regular distances irrespective of the speed of the tractor. Further, while the drilling means descends and is drilling, even if the tractor moves, the supporting frame moves rearwards relatively, whereby the drilling means can maintain its position to continue its drilling work, and when the drilling means ascends after the completion of its drilling work, it can restore its original position by the action of a spring, whereby the entire drilling operation is done while the tractor is running and consequently the drilling performance is extremely superior.

It is a further object of this invention is to provide a driller which is capable of carrying out the drilling operation efficiently by drilling plural holes respectively on both sides of the main frame interchangeably during one drilling operation and simultaneously reducing the power required for the drilling means at the time of each drilling operation.

The above mentioned object of this invention can be achieved by a next embodiment of this invention. Said embodiment comprises preparing for two sets of longitudinal rods, cranks and connecting rods; disposing each set opposite to each other on both side of a main frame; attaching each crank to a driven sprocket shaft so as to mutually face oppositely in the diametrol direction; and further providing a supporting frame with a plurality of drilling means perpendicularly. According to this embodiment, therefore, during one drilling operation the right and left vertical rods alternately go up and down by once respectively and thus the plural drilling means provided at the lower ends thereof are allowed to make the drilling operation by once alternately, besides since the drilling operation to be done by once alternately is only conducted by either of the drilling means on the both sides, the power required for this drilling operation is ½ of that required at the time when all the drilling means makes the drilling operation concurrently.

DETAILED DESCRIPTION OF THE INVENTION

Figure 2:
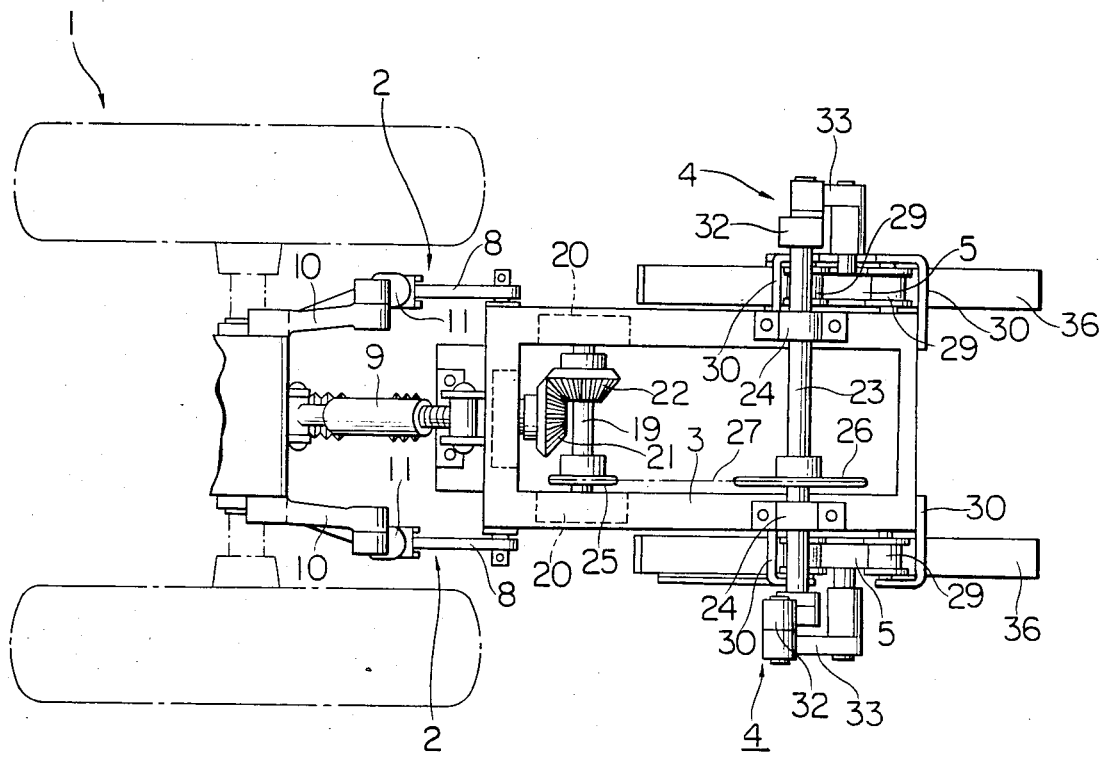
FIG. 2 is a plane view of the driller shown in FIG. 1.

Reference numeral 1 denotes a tractor. A main frame 3 is connected with this tractor 1 through a connecting mechanism 2. The connecting mechanism 2, as is clearly seen especially from FIG. 2, is disposed by a set on both sides. And, each set of the connecting mechanism 2 has a lower link 8 which is pivotally connected at its forward end to the tractor 1 and at its rear end to the main frame 3 and an upper link 9 equipped with a turnbuckle, further above it there is provided a supporting link 10 which forward end has been attached to the tractor, both ends of a connecting link 11 equipped with a turnbuckle are pivotally connected to the rear end of this link 10 and the middle of the link 8, and when controlling the length of links 9 and 11 by the operation of the turnbuckle the location of the main frame 3 can be adjusted.

In the neighborhood of the rear end of the main frame 3 there are disposed a pair of right and left vertical rods 5, which act as up and down means or vertically movable means. These rods 5 each is held between guide rollers 29 so as to go up and down, said guide rollers 29 equipped with flanges being attached rotatably to each pair of brackets 30 disposed oppositely on the upper and lower sides of the main frame. And, to the lower end of each rod 5 is attached a horizontal guide rail 36 which acts as a guide means.

A receiving plate 15 at the forward lower portion of the main frame 3 is provided with a rotary shaft 19 supported rotatably by a pair of right and left bearings 20. To said rotary shaft 19 is attached a driven bevel gear 22. A rotary shaft 17 disposed in the right angle direction relative to the rotary shaft 19 is supported rotatably by a pair of forward and rear bearings 16 mounted on a receiving plate 15, this rotary shaft 17 is provided with a driving bevel gear 21 meshing a bevel gear 22, and the rotary shaft 17 is connected with an output shaft 14 of a driving source (not shown) mounted on the tractor 1 through a universal joint 18. A rotary shaft 23 is supported rotatably on a pair of right and left bearings 24, and this rotary shaft 23 is provided with a driven sprocket 26. A chain 27 is suspended over between both sprockets 25 and 26.

Figure 3:
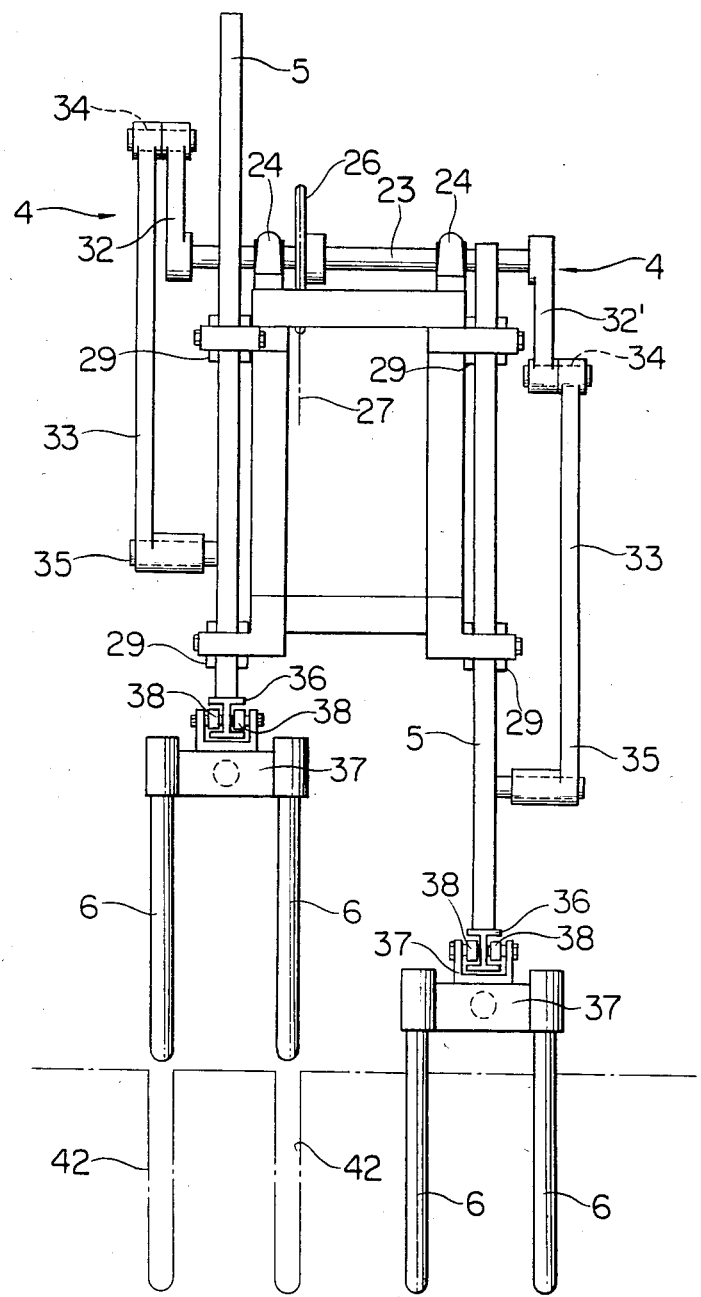
FIG. 3 is a right side view of part of the driller shown in FIG. 1.

The vertical rod 5 is designed to make an up and down movement by the up and down mechanism or vertically actuating mechanism 4. In this up and down mechanism 4, to both ends of the rotary shaft 23 projecting out of the main frame 3 is attached one end of each of cranks 32 and 32'. These cranks 32 and 32', as is apparent from FIG. 3, face oppositely each other in the diametric direction. To the other end of each of these cranks 32 and 32' is pivotally connected a connecting rod 33 through a pin 34 respectively. The other ends of these connecting rods 33 are each pivotally connected to the vertical rod 5. Although two sets of up and down mechanisms are employed in this embodiment, it is possible to provide only one set of up and down mechanism by request, and it is also possible to replace the crank mechanism by the one using an oil pressure pump, an oil pressure motor and the like.

Guide rails 36 attached to the lower ends of the vertical rods 5 are each of a I-shaped section. In the grooves formed on its both sides, rollers 38, which has been provided opposite to the upper front and rear of a supporting frame 37 respectively, are located and hangs down a supporting frame 37 so as to move the supporting frame 37 horizontally along the guide rail 36.

The both ends of this supporting frame are provided with perpendicular drilling rods 6 at the distance of about 25-30 cm (FIG. 3), said rods each being about 3 cm in diameter and about 40-70 cm in length, and the number of these drilling rods 6 may be increased and decreased by request. A tension spring 41 is interposed between a plate 40 attached to the forward end of the guide rail 36 and the forward end of the frame 37 so that the drilling rods 6 may be always biased forward. In this embodiment, the drilling rod 6 is a solid body and its tip is slant from the front to the rear. Various shaped sections may be employed. This driling rod may be made of a pipe. In this case, a soil guide discharge aperture is provided in the upper side wall of the pipe. When putting the drilling operation in practice using the above mentioned driller, the tractor 1 is driven in the rice field and the output shaft 14 is rotated. Due to this, the crank 32 and its rotary shaft 23 are rotated by the action of power transmission means 17, 21, 22, 19, 25, 27, 26 and the like, whereby right and left rods 33 alternately descend and ascend once per rotation of the crank 32.

Figure 1:
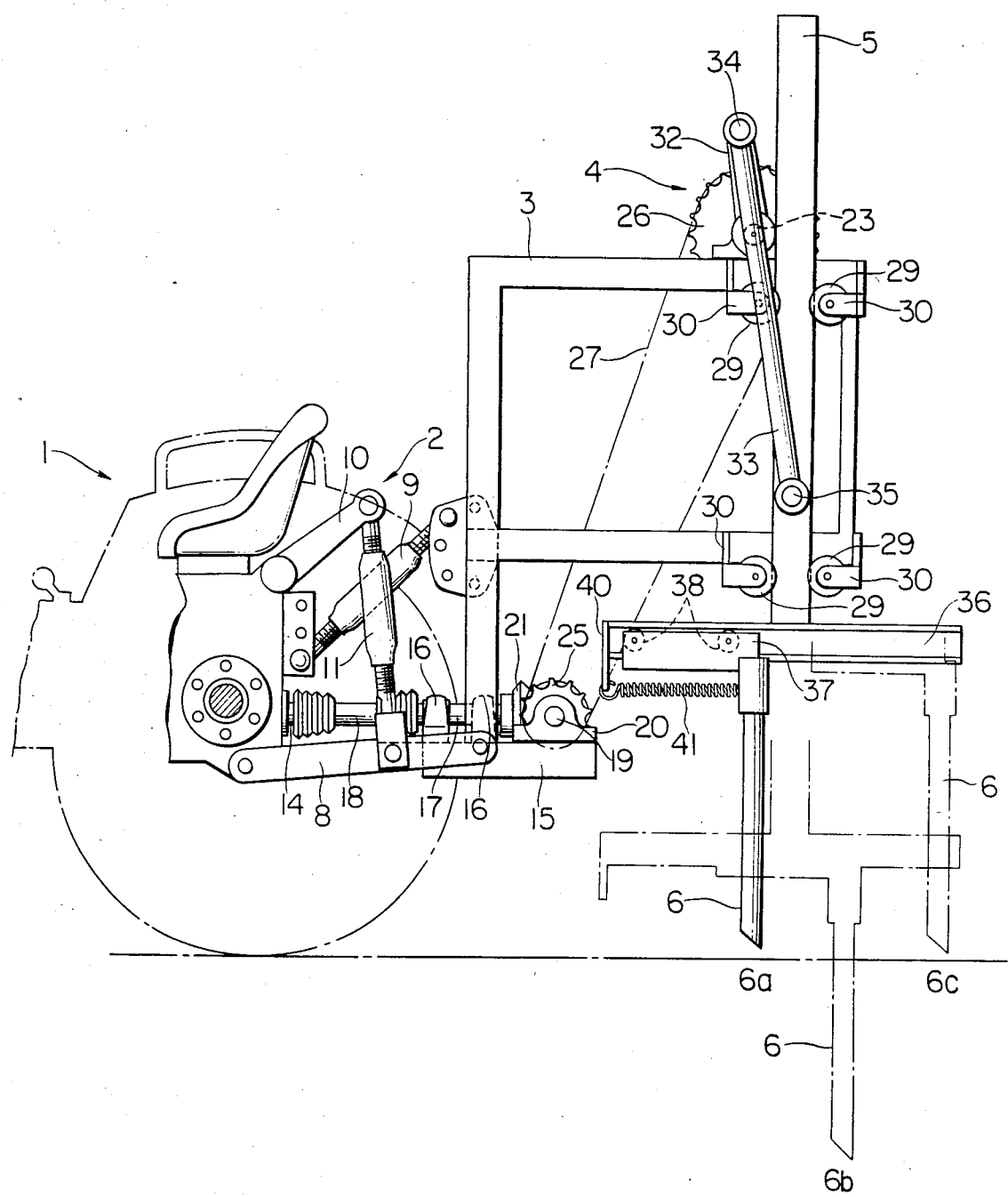
FIG. 1 is a front view of one embodiment of the driller for use in rice field according to this invention.

When the rod 33 descends, the supporting frame 37 held by the guide rail 36 and the drilling rods 6 suspended perpendicularly therefrom and located at 6a in FIG. 1 descend, and are inserted in the soil. During this, the tractor 1 keeps driving. Since the drilling rods 6, as described above, remain inserted in the soil even when the tractor 1 is still driving, the drilling rods are held there. And, then the drilling rods move together with the supporting frame 37 rearwards relatively to the frame 3 against the tension force of a spring 41 and reach the location 6b shown in FIG. 1, whereby the drilling operation terminates.

Thereafter, the drilling rods 6 ascend together with the rod 5. During that, however, the foresaid rearward movement is continued, and when reaching the location 6c shown in FIG. 1, the lower ends of the drilling rods 6 appear above the surface of the earth, and are allowed to restore their original locations 6a by the tension force of the spring 41. Then, the aforesaid operation is repeated again.

Thus, a predetermined plural holes can be drilled in the rice field, wherein the depth, interval and the like of holes may be established suitably by designing the up and down mechanism so as to meet the desired conditions. In the above mentioned embodiment, the driller of this invention is attached to the rear portion of the tractor, but may be attached to the front portion or side portion of the tractor if needed.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A driller for use on a tractor comprising,
    a main frame connected to the tractor,
    a vertically moving rod,
    guide rollers mounted on the main frame supporting the rod for vertical movement but preventing horizontal movement of the rod,
    a vertical actuating mechanism connected to the frame and connected to and driven by a drive source on the tractor and connected to and vertically moving the rod, a horizontally extending guide connected to the lower end of the vertically moving rod, a support means movably supported from and horizontally movable along said guide rod, drilling means connected perpendicularly to the support means for drilling holes in the ground as the vertically moving rod is moved upwardly and downwardly, and biasing means connected between the guide and the support means for biasing the support means towards the tractor when the drilling means is disengaged from the ground.

2. A driller according to claim 1 wherein the vertical actuating means includes a crank attached to the main frame and a connecting rod connecting said crank and vertically moving rod and said crank is fixed on the rotary shaft of a driven sprocket provided at the upper part of the frame, said driven sprocket is connected to a driving sprocket provided at the lower part of the main frame by means of a chain, and said driving sprocket is rotated by the driving source mounted on the tractor.

3. A driller according to claim 2 wherein said vertical rod, crank and connecting rod are mounted in two sets on said main frame perpendicularly and oppositely in the advancing direction, each crank is attached to one driven sprocket shaft mutually facing oppositely in the diametral direction; and said main frame is provided with plural perpendicular drilling means.

* * * * *